(12) United States Patent
Liao

(10) Patent No.: US 10,994,383 B2
(45) Date of Patent: May 4, 2021

(54) DETACHABLE STRUCTURE USED FOR SHEET METAL JOINING

(71) Applicant: Hexin Precision Technology (Wujiang) Co., Ltd., Suzhou (CN)

(72) Inventor: Chongyi Liao, Suzhou (CN)

(73) Assignee: Hexin Precision Technology (Wujiang) Co., Ltd.

( * ) Notice: Subject to any disclaimer, the term of this patent is extended or adjusted under 35 U.S.C. 154(b) by 214 days.

(21) Appl. No.: 16/403,612

(22) Filed: May 5, 2019

(65) Prior Publication Data

US 2020/0262014 A1 Aug. 20, 2020

(30) Foreign Application Priority Data

Feb. 20, 2019 (CN) .......................... 201910127265.0

(51) Int. Cl.
*B23Q 3/00* (2006.01)
*B23Q 3/06* (2006.01)

(52) U.S. Cl.
CPC .................................. *B23Q 3/062* (2013.01)

(58) Field of Classification Search
CPC ....... B23P 11/00; B23P 11/027; B23P 11/005; B23P 19/00; B23P 19/04; B23Q 3/00; B23Q 3/3062; B23Q 3/006; B23Q 3/067
See application file for complete search history.

(56) References Cited

U.S. PATENT DOCUMENTS

| 8,523,156 | B2 * | 9/2013 | Hou .......................... B25B 5/10 269/37 |
| 2016/0084221 | A1 * | 3/2016 | Moeller .................. F03D 13/20 29/464 |
| 2020/0262014 | A1 * | 8/2020 | Liao ....................... B23Q 3/062 |

* cited by examiner

*Primary Examiner* — Lee D Wilson

(57) ABSTRACT

A detachable structure used for sheet metal joining comprising a first fixing frame, a second fixing frame, an anti-offset assembly, a connecting assembly and a pressing assembly; the first fixing frame is connected with the second fixing frame through the anti-offset assembly and the connecting assembly; the second fixing frame comprises a transverse plate a, a transverse plate b, a vertical plate a and a vertical plate b; the transverse plate a is vertically arranged on the edge of the bottom of one side of the vertical plate a, and the transverse plate b is vertically arranged on the edge of the top of one side of the vertical plate a; the vertical plate b is vertically arranged on the edge of one side of the bottom of the transverse plate b.

5 Claims, 3 Drawing Sheets

DETACHABLE STRUCTURE USED FOR SHEET METAL JOINING

TECHNICAL FIELD OF THE INVENTION

The present invention relates to the technical field of sheet metal joining, and more particularly, to a detachable structure used for sheet metal joining.

BACKGROUND OF THE INVENTION

Sheet metals, which are common, are normally connected and fixed through a joining method. In the prior art, traditional sheet-metal-spliced structures neither can enhance the connection strength between the fixing frames, nor prevent the offset between them. Moreover, such structures are unstable, have high structural complexity and high difficulty of disassembly. Thus, it's urgent for those skilled in this field to develop a novel detachable structure used for sheet metal joining.

SUMMARY OF THE INVENTION

The purpose of the present invention is to solve the shortcomings in the prior art by providing a detachable structure used for sheet metal joining, which is simple and can be conveniently disassembled. According to the present invention, the connection strength between the first fixing frame and the second fixing frame can be enhanced, and the offset of the first fixing frame and the second fixing frame can be prevented, further improving the structural stability.

To achieve the above purpose, the present invention adopts the following technical solution:

A detachable structure used for sheet metal joining comprising a first fixing frame, a second fixing frame, an anti-offset assembly, a connecting assembly and a pressing assembly; the first fixing frame is connected with the second fixing frame through the anti-offset assembly and the connecting assembly; the second fixing frame comprises a transverse plate a, a transverse plate b, a vertical plate a and a vertical plate b; the transverse plate a is vertically arranged on the edge of the bottom of one side of the vertical plate a, and the transverse plate b is vertically arranged on the edge of the top of one side of the vertical plate a; the vertical plate b is vertically arranged on the edge of one side of the bottom of the transverse plate b; the first fixing frame comprises a transverse plate c, a transverse plate d, a vertical plate c and a vertical plate d; the transverse plate c is vertically connected to the edge of the bottom of one side of the vertical plate c, and the transverse plate d is vertically connected to the edge of the top of one side of the vertical plate c; the vertical plate d is vertically connected to the edge of one side of the top of the vertical plate c; the vertical plate a and the vertical plate c are arranged in parallel, and the transverse plate b and the transverse plate d are arranged in parallel; the transverse plate a and the transverse plate c are arranged in parallel, and the vertical plate d and the vertical plate b are arranged in parallel;

A cavity is formed among the transverse plate a, the transverse plate b, the vertical plate a and the vertical plate b; the transverse plate c, the transverse plate d and the vertical plate c are located in the cavity, and the vertical plate d is located on the outer side of the vertical plate b;

Two pressing assemblies are symmetrically arranged at the two ends of the top of the transverse plate a.

In another aspect of the present invention, the anti-offset assembly comprises a clamping groove a, a clamping block a, a clamping groove b, a clamping block b, a clamping groove c and a clamping block c. The clamping groove a is formed in the middle of the bottom of the transverse plate b, and the clamping block a is arranged at the middle of the top of the transverse plate d. The clamping block a is clamped into the clamping groove a in a matched mode. The clamping groove b is formed in the middle of one side of the vertical plate a, and the clamping block b is arranged in the middle of one side of the vertical plate c. The clamping block b is clamped into the clamping groove b in a matched mode. The clamping groove c is formed in the top of the transverse plate a, and the clamping block c is arranged at the position where the bottom of the transverse plate c corresponds to the clamping groove c. The clamping block c is clamped into the clamping groove c in a matched mode.

In another aspect of the present invention, the connecting assembly comprises a fixing plate, a first bolt hole, a bolt, a second bolt hole, a third bolt hole, a fixing groove a and a fixing groove b. The fixing groove a is formed in the inner side of the vertical plate c, and the fixing groove b is formed in the position where the inner side of the vertical plate d corresponds to the fixing groove a. The two ends of the fixing plate are correspondingly clamped into the fixing groove a and the fixing groove b. Three first bolt holes are equidistantly formed in one side of the fixing groove b where the fixing plate is located. Three second bolt holes are formed in one side of the fixing groove b that corresponds to the first bolt holes. Three third bolt holes are formed in the position where one side of the vertical plate b corresponds to the second bolt holes. The threaded end of the bolt is in threaded connection with the third bolt hole, the second bolt hole and the first bolt hole in sequence.

In another aspect of the present invention, the pressing assembly comprises a mounting groove, a torsion spring, a connecting shaft and a pressing rod. The mounting groove is formed in the top of the transverse plate a, and the two sides of the mounting groove are correspondingly connected with the two ends of the connecting shaft. A through-hole is formed in one end of the pressing rod, and the pressing rod is connected with the connecting shaft in a sleeved mode through the through-hole. The bottom of the pressing rod is connected with the bottom of the mounting groove through the torsion spring, and the other end of the pressing rod abuts against the outer side of the vertical plate b.

In another aspect of the present invention, the pressing rod is fixedly connected with the connecting shaft.

Compared with the prior art, the present invention has the following advantages:

The clamping block a is clamped into the clamping groove a in a matched mode, the clamping block b is clamped into the clamping groove b in a matched mode, and the clamping block c is clamped into the clamping groove c in a matched mode. According to this arrangement, the first fixing frame and the second fixing frame are fixedly connected, and are effectively prevented from offsetting. Additionally, the two ends of the fixing plate are correspondingly connected with the fixing groove a and the fixing groove b, and the threaded end of the bolt is in threaded connection with the third bolt hole, the second bolt hole and the first bolt hole in sequence. In this way, the connection strength between the first fixing frame and the second fixing frame can be further enhanced, and the structural stability can be greatly improved. When joining the first fixing frame and the second fixing frame, the pressing rod is pulled, forcing the torsion spring to stretch. After the first fixing frame and the second fixing frame are joined in a matched mode, the pressing rod is released. At the moment, one end of the pressing rod abuts against and presses the vertical plate d, preventing the structure from offsetting, and further improving the structural stability. The structure of the present invention enables the first fixing frame and the second fixing frame to be fixedly connected, prevents the first fixing frame and the second fixing frame from offsetting, and improves the structural stability. Moreover, the structure is simple, and can be conveniently disassembled.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

1—The First Fixing Frame, 2—The Second Fixing Frame, 3—Anti-offset Assembly, 31—Clamping Groove a, 32—Clamping Block a, 33—Clamping Groove b, 34—Clamping Block b, 35—Clamping Groove c, 36—Clamping Block c, 4—Connecting Assembly, 41—Fixing Plate, 42—The First Bolt Hole, 43—Bolt, 44—The Second Bolt Hole, 45—The Third Bolt Hole, 46—Fixing Groove a, 47—Fixing Groove b, 5—Pressing Assembly, 51—Mounting Groove, 52—Torsion Spring, 53—Connecting Shaft, 54—Pressing Rod

DETAILED DESCRIPTION OF THE INVENTION

Drawings and detailed embodiments are combined hereinafter to elaborate the technical principles of the present invention.

Figure 1:
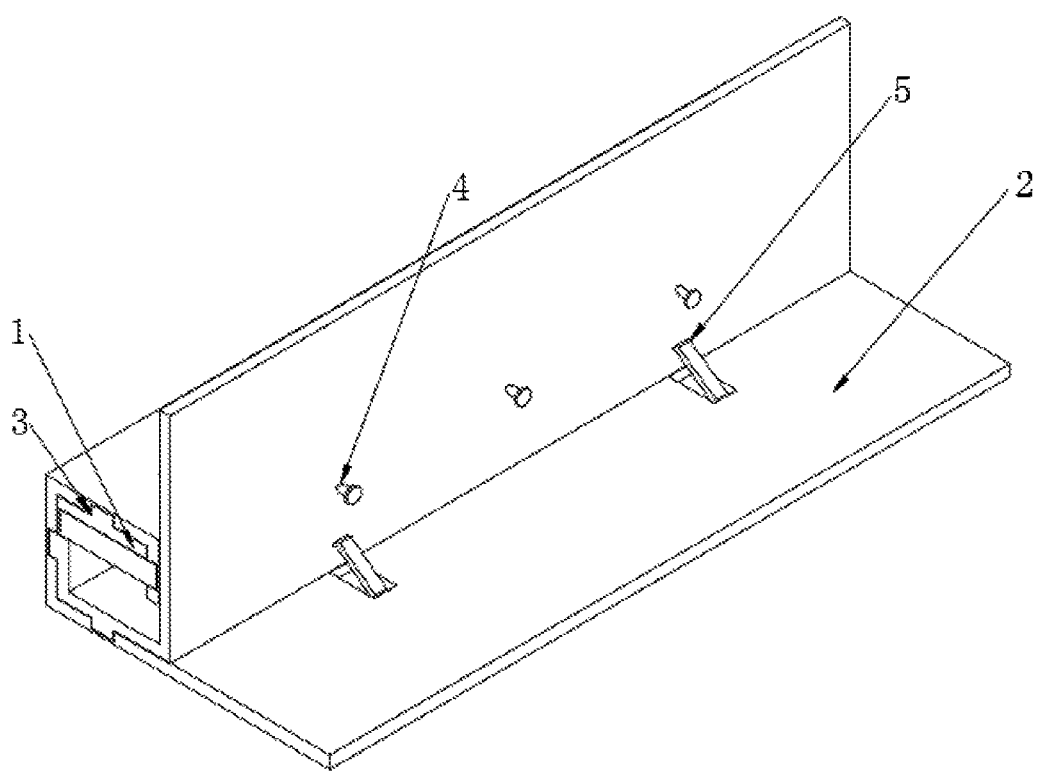
FIG. 1 is a schematic diagram illustrating the overall structure of the present invention.
Figure 2:
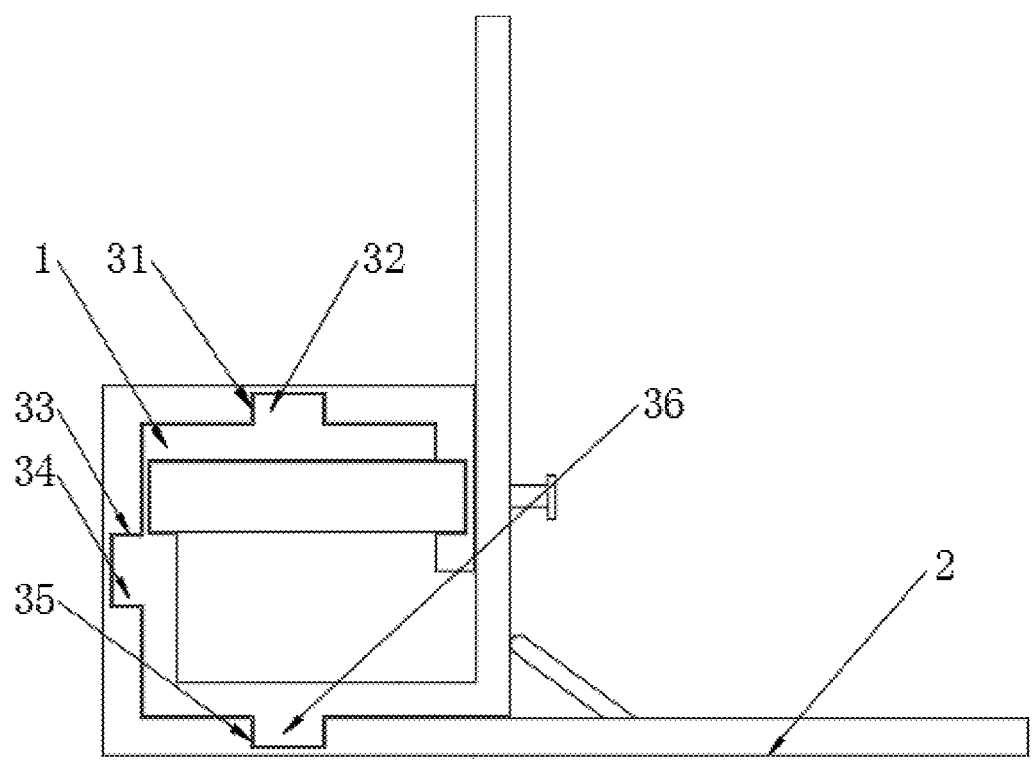
FIG. 2 is a front view of the present invention.
Figure 3:
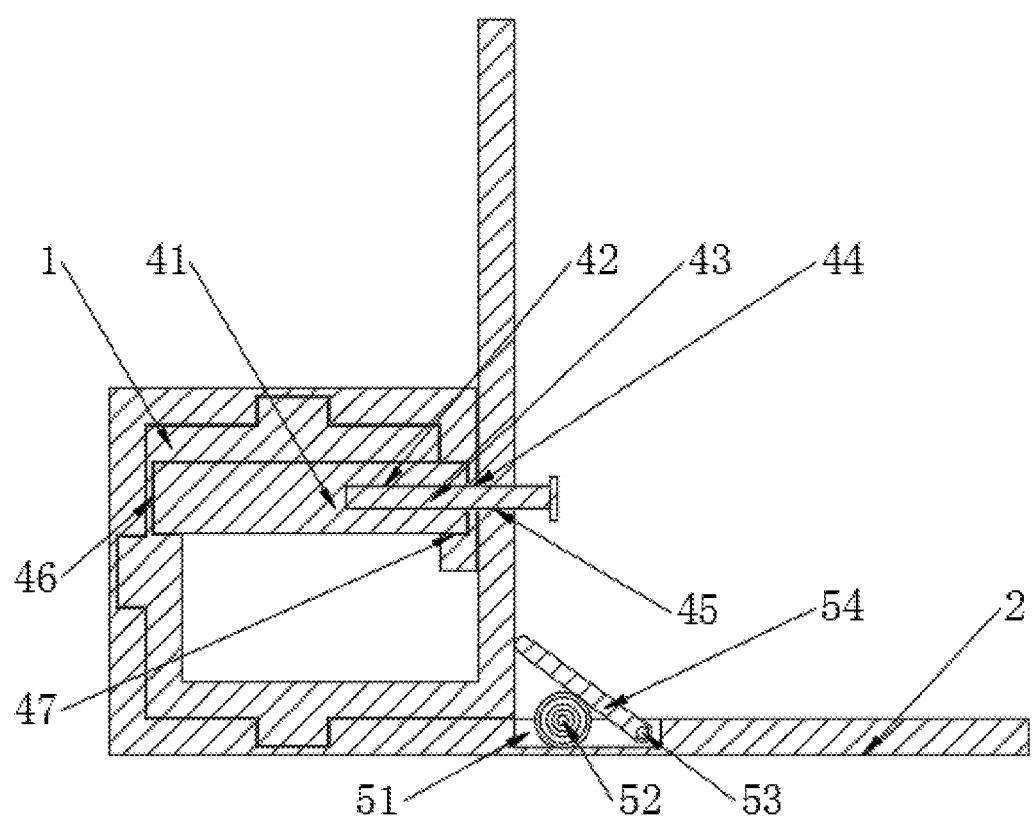
FIG. 3 is a schematic diagram illustrating the internal structure of the present invention.

As shown in FIGS. 1-3, the detachable structure used for sheet metal joining comprises a first fixing frame 1, a second fixing frame 2, an anti-offset assembly 3, a connecting assembly 4 and a pressing assembly 5. The first fixing frame 1 is connected with the second fixing frame 2 through the anti-offset assembly 3 and the connecting assembly 4. The second fixing frame 2 comprises a transverse plate a, a transverse plate b, a vertical plate a and a vertical plate b. The transverse plate a is vertically arranged on the edge of the bottom of one side of the vertical plate a, and the transverse plate b is vertically arranged on the edge of the top of one side of the vertical plate a. The vertical plate b is vertically arranged on the edge of one side of the bottom of the transverse plate b. The first fixing frame 1 comprises a transverse plate c, a transverse plate d, a vertical plate c and a vertical plate d. The transverse plate c is vertically connected to the edge of the bottom of one side of the vertical plate c, and the transverse plate d is vertically connected to the edge of the top of one side of the vertical plate c. The vertical plate d is vertically connected to the edge of one side of the top of the vertical plate c. The vertical plate a and the vertical plate c are arranged in parallel, and the transverse plate b and the transverse plate d are arranged in parallel. The transverse plate a and the transverse plate c are arranged in parallel, and the vertical plate d and the vertical plate b are arranged in parallel.

A cavity is formed among the transverse plate a, the transverse plate b, the vertical plate a and the vertical plate b. The transverse plate c, the transverse plate d and the vertical plate c are located in the cavity, and the vertical plate d is located on the outer side of the vertical plate b.

Two pressing assemblies 5 are symmetrically arranged at the two ends of the top of the transverse plate a.

The anti-offset assembly 3 comprises a clamping groove a31, a clamping block a32, a clamping groove b33, a clamping block b34, a clamping groove c35 and a clamping block c36. The clamping groove a31 is formed in the middle of the bottom of the transverse plate b, and the clamping block a32 is arranged at the middle of the top of the transverse plate d. The clamping block a32 is clamped into the clamping groove a31 in a matched mode. The clamping groove b33 is formed in the middle of one side of the vertical plate a, and the clamping block b34 is arranged in the middle of one side of the vertical plate c. The clamping block b34 is clamped into the clamping groove b33 in a matched mode. The clamping groove c35 is formed in the top of the transverse plate a, and the clamping block c36 is arranged at the position where the bottom of the transverse plate c corresponds to the clamping groove c35. The clamping block c36 is clamped into the clamping groove c35 in a matched mode. According to the above, the first fixing frame 1 and the second fixing frame 2 can be prevented from offsetting.

The connecting assembly 4 comprises a fixing plate 41, a first bolt hole 42, a bolt 43, a second bolt hole 44, a third bolt hole 45, a fixing groove a46 and a fixing groove b47. The fixing groove a46 is formed in the inner side of the vertical plate c, and the fixing groove b47 is formed in the position where the inner side of the vertical plate d corresponds to the fixing groove a46. The two ends of the fixing plate 41 are correspondingly clamped into the fixing groove a46 and the fixing groove b47. Three first bolt holes 42 are equidistantly formed in one side of the fixing groove b47 where the fixing plate 41 is located. Three second bolt holes 44 are formed in one side of the fixing groove b47 that corresponds to the first bolt holes 42. Three third bolt holes 45 are formed in the position where one side of the vertical plate b corresponds to the second bolt holes 44. The threaded end of the bolt 43 is in threaded connection with the third bolt hole 45, the second bolt hole 44 and the first bolt hole 42 in sequence. In this way, the first fixing frame 1 and the second fixing frame 2 are fixedly connected, and are prevented from offsetting and deforming.

The pressing assembly 5 comprises a mounting groove 51, a torsion spring 52, a connecting shaft 53 and a pressing rod 54. The mounting groove 51 is formed in the top of the transverse plate a, and the two sides of the mounting groove 51 are correspondingly connected with the two ends of the connecting shaft 53. A through-hole is formed in one end of the pressing rod 54, and the pressing rod 54 is connected with the connecting shaft 53 in a sleeved mode through the through-hole. The bottom of the pressing rod 54 is connected with the bottom of the mounting groove 51 through the torsion spring 52, and the other end of the pressing rod 54 abuts against the outer side of the vertical plate b. By means of this design, the vertical plate d can be abutted and pressed so that the structure can be prevented from offsetting.

The pressing rod 54 is fixedly connected with the connecting shaft 53.

The operating principle of the present invention is the following:

The clamping block a32 is clamped into the clamping groove a31 in a matched mode, the clamping block b34 is clamped into the clamping groove b33 in a matched mode, and the clamping block c36 is clamped into the clamping groove c35 in a matched mode. According to this arrangement, the first fixing frame 1 and the second fixing frame 2 are fixedly connected, and are effectively prevented from offsetting. Additionally, the two ends of the fixing plate 41 are correspondingly connected with the fixing groove a46 and the fixing groove b47, and the threaded end of the bolt 43 is in threaded connection with the third bolt hole 45, the second bolt hole 44 and the first bolt hole 42 in sequence. In this way, the connection strength between the first fixing frame 1 and the second fixing frame 2 can be further enhanced, and the structural stability can be greatly improved. When joining the first fixing frame 1 and the second fixing frame 2, the pressing rod 54 is pulled, forcing the torsion spring 52 to stretch. After the first fixing frame 1 and the second fixing frame 2 are joined in a matched mode, the pressing rod 54 is released. At the moment, one end of the pressing rod 54 abuts against and presses the vertical plate d, preventing the structure from offsetting, and further improving the structural stability. The structure of the present invention enables the first fixing frame 1 and the second fixing frame 2 to be fixedly connected, prevents the first fixing frame 1 and the second fixing frame 2 from offsetting, and improves the structural stability. Moreover, the structure is simple, and can be conveniently disassembled.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A detachable structure used for sheet metal joining, comprising:
   a first fixing frame,
   a second fixing frame,
   an anti-offset assembly,
   a connecting assembly, and
   a pressing assembly, wherein the first fixing frame is connected with the second fixing frame through the anti-offset assembly and the connecting assembly, wherein the second fixing frame comprises a transverse plate a, a transverse plate b, a vertical plate a and a vertical plate b, wherein the transverse plate a is vertically arranged on the edge of the bottom of one side of the vertical plate a, and the transverse plate b is vertically arranged on the edge of the top of one side of the vertical plate a, wherein the vertical plate b is vertically arranged on the edge of one side of the bottom of the transverse plate b, wherein the first fixing frame comprises a transverse plate c, a transverse plate d, a vertical plate c and a vertical plate d, wherein the transverse plate c is vertically connected to the edge of the bottom of one side of the vertical plate c, and the transverse plate d is vertically connected to the edge of the top of one side of the vertical plate c, wherein the vertical plate d is vertically connected to the edge of one side of the top of the vertical plate c, wherein the vertical plate a and the vertical plate c are arranged in parallel, and the transverse plate b and the transverse plate d are arranged in parallel, wherein the transverse plate a and the transverse plate c are arranged in parallel, and the vertical plate d and the vertical plate b are arranged in parallel, wherein
   a cavity is formed among the transverse plate a, the transverse plate b, the vertical plate a and the vertical plate b, wherein the transverse plate c, the transverse plate d and the vertical plate c are located in the cavity, and the vertical plate d is located on the outer side of the vertical plate b, wherein
   two pressing assemblies are symmetrically arranged at the two ends of the top of the transverse plate a.

2. The detachable structure used for sheet metal joining of claim 1, wherein the anti-offset assembly comprises a clamping groove a, a clamping block a, a clamping groove b, a clamping block b, a clamping groove c and a clamping block c, wherein the clamping groove a is formed in the middle of the bottom of the transverse plate b, and the clamping block a is arranged at the middle of the top of the transverse plate d, wherein the clamping block a is clamped into the clamping groove a in a matched mode, wherein the clamping groove b is formed in the middle of one side of the vertical plate a, and the clamping block b is arranged in the middle of one side of the vertical plate c, wherein the clamping block b is clamped into the clamping groove b in a matched mode, wherein the clamping groove c is formed in the top of the transverse plate a, and the clamping block c is arranged at the position where the bottom of the transverse plate c corresponds to the clamping groove c, wherein the clamping block c is clamped into the clamping groove c in a matched mode.

3. The detachable structure used for sheet metal joining of claim 1, wherein the connecting assembly comprises a fixing plate, a first bolt hole, a bolt, a second bolt hole, a third bolt hole, a fixing groove a and a fixing groove b, wherein the fixing groove a is formed in the inner side of the vertical plate c, and the fixing groove b is formed in the position where the inner side of the vertical plate d corresponds to the fixing groove a, wherein the two ends of the fixing plate are correspondingly clamped into the fixing groove a and the fixing groove b, wherein three first bolt holes are equidistantly formed in one side of the fixing groove b where the fixing plate is located, wherein three second bolt holes are formed in one side of the fixing groove b that corresponds to the first bolt holes, wherein three third bolt holes are formed in the position where one side of the vertical plate b corresponds to the second bolt holes, wherein the threaded end of the bolt is in threaded connection with the third bolt hole, the second bolt hole and the first bolt hole in sequence.

4. The detachable structure used for sheet metal joining of claim 1, wherein the pressing assembly comprises a mounting groove, a torsion spring, a connecting shaft and a pressing rod, wherein the mounting groove is formed in the top of the transverse plate a, and the two sides of the mounting groove are correspondingly connected with the two ends of the connecting shaft, wherein a through-hole is formed in one end of the pressing rod, and the pressing rod is connected with the connecting shaft in a sleeved mode through the through-hole, wherein the bottom of the pressing rod is connected with the bottom of the mounting groove through the torsion spring, and the other end of the pressing rod abuts against the outer side of the vertical plate b.

5. The detachable structure used for sheet metal joining of claim 4, wherein the pressing rod is fixedly connected with the connecting shaft.

\* \* \* \* \*